United States Patent [19]

McKay et al.

[11] 4,283,825
[45] Aug. 18, 1981

[54] HEAVY DUTY PRESS

[76] Inventors: John McKay; Billy C. Hawkins, both of 41 Hampton Arms, Greenville, S.C. 29607

[21] Appl. No.: 72,065

[22] Filed: Sep. 4, 1979

[51] Int. Cl.³ .......................................... B23P 19/02
[52] U.S. Cl. ..................................... 29/251; 100/257
[58] Field of Search .................. 29/251; 100/257, 214

[56] References Cited

U.S. PATENT DOCUMENTS

| | | | |
|---|---|---|---|
| 2,387,839 | 10/1945 | Frost | 100/257 |
| 2,502,072 | 3/1950 | Bender | 100/257 |
| 3,229,619 | 1/1966 | Van Dronen | 100/257 |
| 3,283,699 | 11/1966 | Hawkins | 29/251 |
| 4,003,305 | 1/1977 | King | 29/251 |

*Primary Examiner*—James L. Jones, Jr.

*Attorney, Agent, or Firm*—Wellington M. Manning, Jr.; Luke J. Wilburn, Jr.

[57] ABSTRACT

A heavy duty press including spaced apart, inturned, U-shaped vertical supports welded to a horizontal support structure extending therebetween at contiguous surfaces, a work support table adjustably receivable on the vertical supports and a spring biased, power operated carriage received above the work support table, the carriage having guide sleeves at opposite ends that are received around the vertical supports and carrying a work element to act on a workpiece on the table. The vertical supports have elongated vertical slots to permit an elongated workpiece to be acted on and clamps associated with the vertical supports may be employed to hold an elongated workpiece.

10 Claims, 6 Drawing Figures

HEAVY DUTY PRESS

BACKGROUND OF THE INVENTION

The present invention relates to a heavy duty press of the type that would be used around machine shops, auto repair shops and the like for removing bearings or other force fit items that are frictionally held on a shaft or other elongated element. Likewise, presses of the type of which the present invention relates are utilized to straighten elongated rods and the like and to perform other jobs where force is required against an article to perform an assembly, disassembly or the like.

Since the presses of the type to which the present invention relates exert a tremendous amount of force on a workpiece, it is quite necessary that the presses be structurally stable, in that, the press structure must be both rigid and strong such that when applying a work force, component structural features of the press will not distort, bend, break or the like. Further, in presses of the present general type where a movable carriage or other work element carrying structure is moved along a vertical path by a manually operated hydraulic jack or the like against a workpiece to perform the desired work function thereon, it is necessary that the structure carrying the work element move in a precise and aligned fashion, whereby once the workpiece is set for receiving the work force to be applied thereto, the carriage or other work element supporting structure will move as desired into contact with the workpiece to perform the desired task. As such, it is necessary that apparatus be provided to properly guide the carriage or work element supporting structure whereby same does not bind against other structural elements of the press, the carriage moves at the same rate of speed across its length, and there is no tilting or canting of the carriage that could cause misalignment between the work element and the workpiece.

Presses of the general type to which the present invention belongs have heretofore been manufactured in various and sundry fashions. Such presses have routinely utilized manually operated hydraulic jacks as a power source for moving a carriage carrying a work element against a workpiece where the workpiece is supported on a work support table. Techniques for guiding the carriage are provided in the prior art, attempting to maintain a proper carriage movement as pointed out above. Likewise prior art presses have generally been structurally fabricated in attempts to provide the requisite strength and rigidity necessary for a heavy duty press of this type. The present invention is believed to be an improvement over all known prior art presses due to the fact that a much more rigid and stronger press assembly is provided due to the unique arrangement of the component parts. Likewise the carriage assembly is believed to represent an improvement that ensures proper carriage alignment with the guiding arrangement possessing virtually the same strength requirements as the press itself.

Known prior art includes the following listed U.S. Pat. Nos.: 1,182,023, McGregor; 1,755,403, Manley; 2,267,662, Miller; 2,387,839, Frost; 2,502,072, Bender; 2,742,853, Knelson; 3,249,041, Johnson; 3,283,699, Hawkins; 3,302,556, Durbin; and 3,359,618, Murphy. This known prior art is not believed to individually or in combination teach or suggest the subject matter of the present invention.

SUMMARY OF THE INVENTION

It is an object of the present invention to provide an improved heavy duty press.

Another object of the present invention is to provide an improved heavy duty press that possesses improved strength and rigidity insofar as the structural framework is concerned.

Yet another object of the present invention is to provide an improved heavy duty press having improved guide means for the movable carriage portion of same.

Still further another object of the present invention is to provide an improved heavy duty press having improved capability for performing work on elongated workpieces.

Generally speaking, the improved heavy duty press of the present invention comprises a pair of spaced apart vertical supports, each support having a generally U-shaped configuration facing the opposite support; stabilizing means secured to said vertical supports at a lower end thereof; a generally U-shaped horizontal support structure received between said vertical support members, opposite ends of said horizontal support structure being partially received within said U-shaped configuration of an upper end of said vertical support members and being secured thereto at contiguous surfaces; a work support table secured between said vertical support members, said work support table being adapted for vertical adjustment along a portion of said vertical support members; a carriage assembly received between said vertical support members above said work support table and being movable in the plane of said vertical support members, said carriage having a work element associated therewith; spring means secured between said horizontal support structure and said carriage, said spring means biasing said carriage in an upward direction; and power means received between said horizontal support structure and said carriage, said power means being operable to move said carriage downwardly against the bias of said spring means to bring said work element into contact with a workpiece received on said work support table.

More specifically, the press of the present invention preferably utilizes rolled steel vertical support members that have a U-shaped configuration, including a base and legs extending from opposite sides of the base to define the U-shape. The legs of the U face the opposite support member. As such, the generally U-shaped horizontal support structure including a horizontal base, and vertical leg elements which extend transversely outwardly from the leg elements is provided atop the spaced apart vertical support members with the base and leg elements of the horizontal support structure being received in an open end of the U-shaped configuration of each vertical support member whereby contiguous exposed surfaces may be welded or otherwise secured to provide a stronger structural unit. In like fashion, exposed contiguous surfaces of the transverse terminal portions of the legs of the horizontal support structure may likewise be welded to contiguous exposed surfaces of the tops of the vertical support members. With the vertical support members having the U-shaped configuration turned inwardly, the openings exposed therealong to permit vertical adjustment of the work support table are of course provided more directly beneath the work support table and as such afford a greater support therefor.

As to the movable carriage assembly that has the work element associated therewith, the carriage extends between the vertical support members and is provided with a sleeve at each opposite end thereof, the sleeves extending completely around the vertical support members with the tolerances between the external dimensions of the vertical support members and the internal dimensions of the sleeves being such that the carriage is guided along its vertical path without canting or tilting. A proper vertical alignment between the work element and the workpiece on which the work is to be performed is thus attained. Further, with respect to the sleeve guiding arrangement of the present invention, a greater degree of strength is realized than with prior art presses where guide means are located along or at the ends of the movable carriage.

Each vertical support member is further provided with an elongated slot extending vertically along a portion of same at a location above at least one position for the vertical support table whereby an elongated rod type element may be inserted through the oppositely positioned elongated slots to be received atop the work support table permitting work to be performed on the rod. If, for example, the elongated rod is bent and requires straightening, such an operation can be performed thereon. In conjunction with the elongated slots in the vertical support members, clamp means may be provided along the vertical support member to receive the rod and secure same against twisting during performance of the work. The clamp means reside around a portion of the rod and are received within the U-shaped configuration of the vertical support means.

DESCRIPTION OF THE PREFERRED EMBODIMENTS

Figure 1:
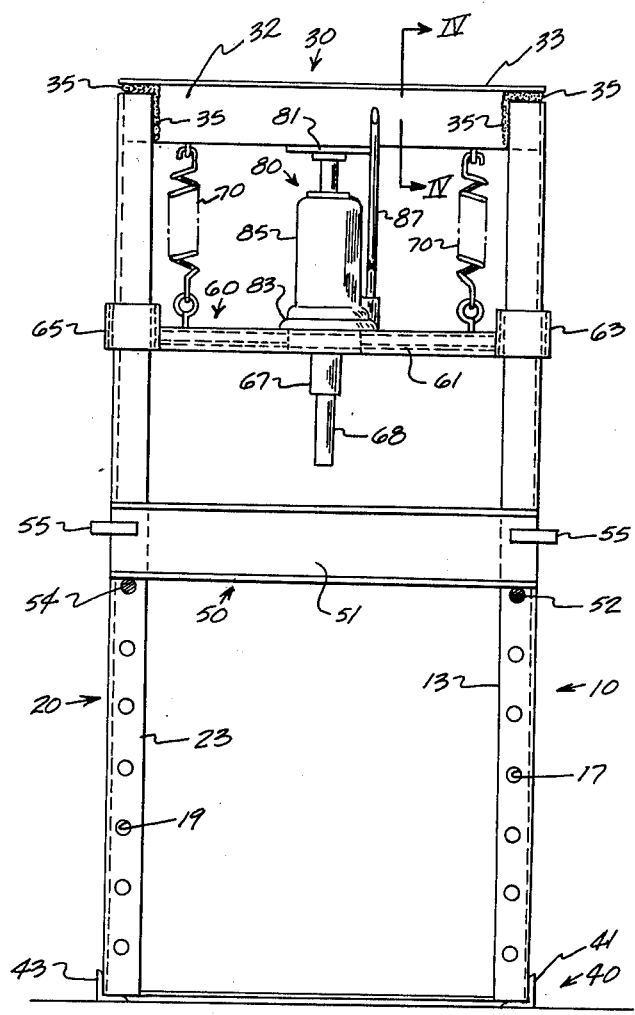
FIG. 1 is a front elevational view of a heavy duty press according to the present invention.
Figure 2:
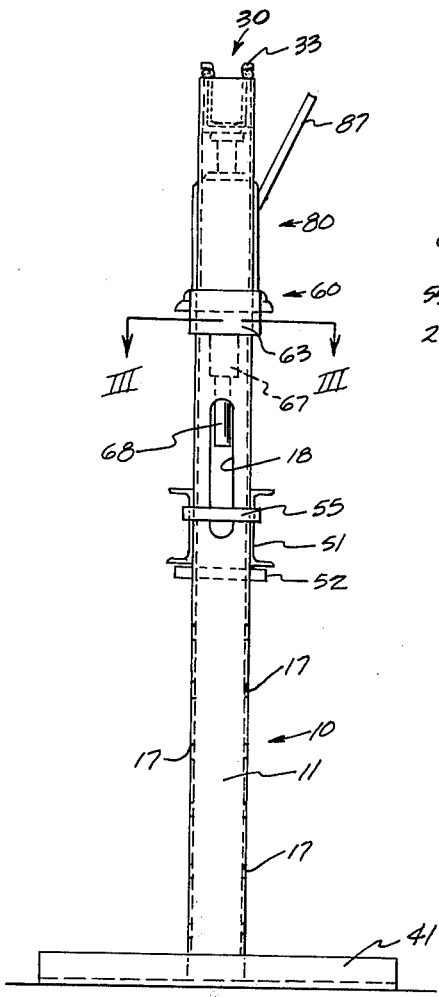
FIG. 2 is a side elevational view of the press as illustrated in FIG. 1.
Figure 3:
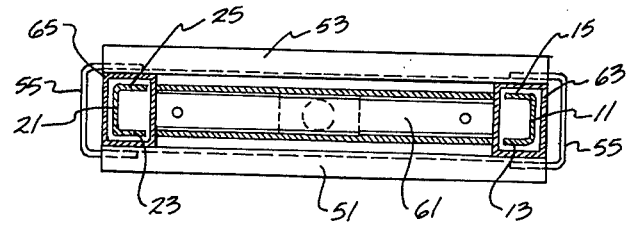
FIG. 3 is a horizontal cross sectional view of the press as illustrated in FIG. 1 taken along a line III—III.

Making reference to the Figures, preferred embodiments of the present invention will now be described in detail. With particular reference to FIGS. 1, 2 and 3, the heavy duty press of the present invention includes a pair of spacially separate vertical support elements generally indicated as 10 and 20 respectively. A horizontal support structure generally 30 extends across the space between vertical supports 10 and 20 while being secured at opposite ends thereto. Stabilizing means generally indicated as 40 are provided at a lower end of vertical support elements 10 and 20 to ensure proper positioning of the press on a support surface. A work support table generally indicated as 50 is located between vertical support elements 10 and 20 and is vertically adjustable therealong to receive a workpiece on which work is to be performed by the press of the present invention. Located between work support table 50 and horizontal support structure 30 is a vertically movable carriage assembly generally indicated as 60 which likewise extends between vertical support elements 10 and 20 and which is provided with spring means 70 secured between carriage assembly 60 and horizontal support structure 30 to bias carriage assembly 60 in the upward direction. A power means generally indicated as 80 is secured between horizontal support structure 30 and carriage assembly 60 and is operable to apply force against the bias of spring means 70 to move carriage assembly 60 in the direction of work support table 50 for performance of work on a workpiece supported thereon.

Spaced apart vertical support members 10 and 20 include base plates 11 and 21, respectively, to which legs 13 and 15 and 23 and 25, respectively, are secured and extend inwardly therefrom towards the opposite vertical support member, whereby the general configuration of each vertical support member is U-shaped. Intermediate its length, vertical support member 10 is provided with a series of vertically spaced openings 17 that extend through legs 13 and 15, the purpose of which will be described hereinafter. In like fashion, vertical support member 20 is provided with a series of corresponding vertically spaced openings 19 extending through legs 23 and 25. Further, for a purpose that will be described hereinafter, vertical support elements 10 and 20 are provided with elongated slots 18 and 28, respectively, in base plates 11 and 21, slots 18 and 28 being located along vertical supports 10 and 20 at a location above at least one position for support table 50.

Figure 4:
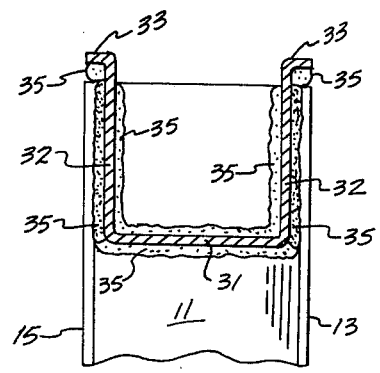
FIG. 4 is a vertical cross sectional view of a portion of the press as illustrated in FIG. 1 taken along a line IV—IV to better illustrate securement between the vertical support members and the horizontal support structure.

Horizontal support structure 30 is made up of a horizontal base section 31 and spaced apart vertical leg elements 32 secured thereto defining a U-shaped structure, with leg elements 32 having transverse extending terminal portions 33. Outer ends of the U-shape of support structure 30 reside within an upper end of U-shaped vertical support elements 10 and 20, with leg elements 32 being contiguous to legs 13 and 15 and 23 and 25, respectively, of vertical supports 10 and 20, while transverse portions 33 reside atop an upper end of vertical support elements 10 and 20. With the U-shaped configuration of vertical support elements 10 and 20 facing inwardly, opposite each other, and with outer ends of horizontal support structure 30 basically residing therewithin, exposed contiguous surfaces of horizontal support structure 30 and vertical support elements 10 and 20 may be secured together, preferably by weldments 35 (See FIG. 4). When all contiguous surfaces are welded, a particularly strong structure results, one believed to be superior in strength and rigidity to prior art presses. At an opposite end of vertical support elements 10 and 20 is a stablizing means generally indicated as 40. Stabilizing means 40 may be any supporting structure that affords upstanding stability for the press, and preferably comprises a pair of L-shaped legs 41 and 43 which are secured to vertical support elements 10 and 20, respectively, and extend outwardly in opposite directions from vertical support elements 10 and 20 transverse to the longitudinal length of vertical support elements 10 and 20. The heavy duty press of the present invention will thus stand alone and possesses adequate strength and rigidity to perform its intended function.

Work support table 50 comprises a pair of parallel side panels 51 and 53 that are spaced apart to receive a portion of a workpiece therethrough, if desired. Side panels 51 and 53 extend across the entire width of the press of the present invention with the outer ends of same residing adjacent the legs 13, 15, 23 and 25 of the U of the vertical support elements 10 and 20 through which openings 17 and 19 are provided. Suitable pins or support rods 52 and 54 are provided within the appropriate aligned openings 17 and 19 and extend outwardly from the openings to permit the work table 50, and specifically the side panels 51 and 53 to rest on the outer ends of same. By movement of support rods 52 and 54 into appropriate aligned openings 17 and 19, the height of work support table 50 may be varied. Work table 50 is further provided with handle means 55 at opposite ends thereof to facilitate the movement of same when vertical adjustment is desired.

Carriage assembly 60, located between horizontal support structure 30 and work support table 50 comprises a horizontal element 61 that extends generally substantially across the space between vertical support elements 10 and 20 and is provided with a guide sleeve 63 at one end and a guide sleeve 65 at an opposite end. Sleeves 63 and 65 reside around their respective vertical support elements 10 or 20, and are of an internal dimension to move freely therealong while precluding any tilting or canting of carriage assembly 60. As illustrated in the Figures, and as preferred, the height of guide sleeves 63 and 65 is greater than the thickness of horizontal element 61 to facilitate improved protection against tilting and canting of carriage assembly 60. Secured to an underside of horizontal element 61 of carriage assembly 60 is a chuck 67 or other work element holding means in which a pin 68 or other work element may be suitably securely received, and depend downwardly therefrom, or to be presented in a proper position for performing the desired work function. Spring means 70, preferably coil springs are secured at one end to horizontal support structure 30, particularly to base 31 and at an opposite end to horizontal element 61 of carriage 60 and apply a bias on carriage assembly 60, tending to force same in an upward direction. Two such springs 70 are preferably provided, one being adjacent each vertical support element 10 and 20.

A power means 80 is secured at one end at an underside of base 31 of horizontal support structure 30, preferably to a plate 81 and at an opposite end at carriage assembly 60, again preferably to a plate 83 that in turn is secured to horizontal element 61 of carriage assembly 60. Power means 80 is preferably a manually operated hydraulic jack 85 having a manual actuating handle 87 which may be operated to apply force against the bias of spring means 70 and move carriage assembly 60 downwardly to present work element 68 at a proper disposition for performing its intended function on a workpiece that is received on work support bed 50.

Operation of the heavy duty press according to the present invention may be carried out as follows. With work support table 50 residing atop support rods 52 and 54 that are received in the desired openings 17 and 19, a workpiece such as a bearing having a shaft therethrough may be placed atop table 50, with the shaft extending through the space between side panels 51 and 53 of work table 50. With the appropriate work element 68 received in chuck 67 of carriage 60, the jack 85 may be actuated to force carriage assembly 60 downwardly. Carriage 60 is appropriately guided in a properly vertically aligned position by guide sleeves 63 and 65 whereby work element 68 is brought into properly aligned contact with the shaft of the workpiece and force same from within the bearing. Subsequent to performing the desired work function, carriage 60 is returned to its upper position.

Figure 6:
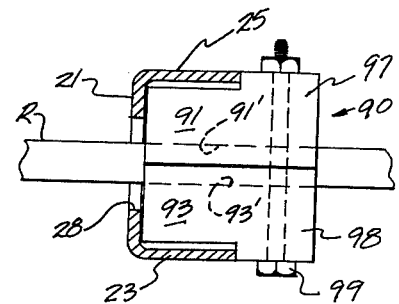
FIG. 6 is a horizontal cross sectional view taken along a line VI—VI of FIG. 5.
Figure 5:
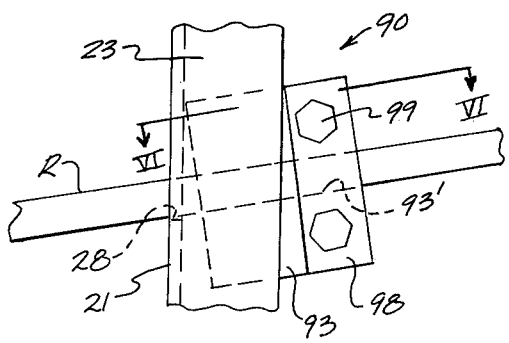
FIG. 5 is a partial side elevational view of a vertical support member of a press according to the present invention illustrating, in particular, elongated rod clamp means.

As mentioned hereinbefore, various work functions may be performed by the press of the present invention. For example, should an elongated rod type element R have an undesired bend therein, the elongated element, serving as a workpiece, may be located across work table 50, extending through elongated slots 18 and 28 of vertical support legs 10 and 20. As shown particularly in FIGS. 5 and 6, a clamp means generally 90 may be received around a portion of elongated rod R adjacent vertical support elements 10 and 20. Clamp means 90 is comprised of two mateable elements 91 and 93, each of which has a complimentary cut out section 91' and 93' respectively, which when combined defines a generally circular slot for receiving a portion of elongated rod R therein. Bolts or other fastening means 99 pass through appropriate enlarged face portions 97 and 98 of clamp elements 91 and 93, respectively, and secure same against elongated rod R, while enlarged face portions 97 and 98 preclude lateral movement of rod R away from the desired location where the work element 68 will come into contact therewith. In like fashion, the dimensions of clamp means 90 are such that same will loosely be received within the U-shaped portions of vertical support elements 10 and 20 to preclude elongated rod element R from twisting while the work is being performed thereon. As illustrated in FIG. 5, clamp means 90, before rod R is straightened, will be slightly displaced from the U of vertical support 20, and during straightening of rod R will move further into the U, as shown in FIG. 6.

Having described the present invention in detail, it is obvious that one skilled in the art will be able to make variations and modifications thereto without departing from the scope of the invention. Accordingly, the scope of the present invention should be determined only by the claims appended hereto.

That which is claimed is:

1. An improved heavy duty press comprising:
   (a) a pair of spaced apart vertical support members, each said support member having a generally U-shaped configuration and defining an elongated slot in a base of the U, said slots being opposite each other;
   (b) stabilizing means secured to said vertical support members at a lower end thereof;
   (c) a horizontal support member received between said vertical support members and secured thereto along contiguous surfaces of said vertical and horizontal members;
   (d) a work support table secured between said vertical support members, said work support table being adapted for vertical adjustment along a portion of said vertical support members;
   (e) a carriage assembly received between said vertical support members above said work support table and being guideably movable in the plane of said vertical support members, said carriage assembly having a work element associated therewith;
   (f) spring means secured between said horizontal support member and said carriage assembly, said spring means biasing said carriage assembly in a direction toward said horizontal support member;
   (g) power means received between said horizontal support member and said carriage assembly, said power means being operable to move said carriage assembly against the bias of said spring means to bring said work element into contact with a workpiece received at said work support table; and (h) workpiece holding means receivable within the generally U-shaped configuration of said vertical support members along said elongated vertical slots, said holding means being adapted to receive a portion of an elongated workpiece adjacent at least one of said elongated slots and hold same against rotation when acted upon by said work element.

2. An improved heavy duty press as defined in claim 1 wherein said holding means comprises a pair of mating elements, which elements cooperatively define a workpiece receiving opening and means to secure said mating elements around said portion of said workpiece.

3. A heavy duty press as defined in claim 2 wherein said workpiece receiving opening in said holding means is generally circular to receive a portion of an elongated circular workpiece.

4. A heavy duty press as defined in claim 1 wherein legs of said generally U-shaped vertical support members face inwardly.

5. The heavy duty press as defined in claim 1 wherein said horizontal support member has a plate secured to a lower side of same generally at a midpoint along its length, one end of said power means being secured to said plate.

6. The heavy duty press as defined in claim 1 wherein the carriage assembly extends across the space between said vertical support members, each end of said carriage having a guide sleeve secured thereat, said guide sleeves residing around said vertical support members whereby said carriage assembly is guided during up and down movement.

7. The heavy duty press as defined in claim 6 wherein said guide sleeves extend upwardly from said carriage assembly.

8. The heavy duty press as defined in claim 1 wherein each vertical support member has a plurality of openings in projecting legs of said U-shaped configuration, and wherein said support rods are received in aligned openings, said work support table residing on and being supported by said rods, said rods being receivable in each of said holes of said vertical support members whereby vertical adjustment of said work support table is provided.

9. A heavy duty press as defined in claim 1 wherein the power means comprises a hydraulic jack.

10. A heavy duty press as defined in claim 1 wherein the spring means comprises a pair of coil springs.

* * * * *